N. H. LOSEY.
CINEMATOGRAPHY APPARATUS.
APPLICATION FILED JUNE 21, 1915.

1,291,954.

Patented Jan. 21, 1919.

WITNESSES:
J. H. Gardner
M. E. Sparrow

INVENTOR:
North H. Losey,
BY
E. T. Silvius
ATTORNEY.

UNITED STATES PATENT OFFICE.

NORTH H. LOSEY, OF INDIANAPOLIS, INDIANA.

CINEMATOGRAPHY APPARATUS.

1,291,954.  Specification of Letters Patent.  Patented Jan. 21, 1919.

Application filed June 21, 1915. Serial No. 35,209.

*To all whom it may concern:*

Be it known that I, NORTH H. LOSEY, a citizen of the United States, residing at Indianapolis, in the county of Marion and State of Indiana, have invented a new and useful Cinematography Apparatus, of which the following is a specification, reference being had to the accompanying drawings and to the letters and figures of reference marked thereon.

This invention relates to that division of cinematography which embraces means for taking the pictures, and means whereby they are reproduced and viewed, the invention contemplating means whereby in certain cases the pictures shall appear simply stereoscopic, in other cases as approximately in natural color and stereoscopic, and in still other cases with the addition of the motions of the original objects or scenes from which the reproductions or records were made; and, more specifically, the invention relates further to the recording and reproduction of objects or scenes, through pairs of right and left lenses, images on a single film to appear when viewed as above-mentioned.

An object of the invention is to provide improved means for expeditiously, effectively, and economically recording cinematographic stereo pairs of images on a single film, and means for reproducing the images from a like positive record film made therefrom.

Another object is to provide improved means of taking either plain records or color effect records advantageously and by one and the same apparatus with slight modification in use.

Another object is to provide an improved photographic instrument having simple means for converging a pair of lenses and automatically focusing them while the instrument is in use, and without requiring the operator to look away from the object being photographed; which instrument shall be adaptable with slight modification to be used to great advantage either for taking or for projecting pictures.

Another object is to provide a photographic instrument with means for conveniently and removably supporting either a pair of complementary color lenses or a colorless lens combination, and so as to be variously adjustable, in order that various results may be advantageously obtained with a single instrument.

Another object is to provide improved methods and means whereby the most perfect, attractive and pleasing pictures may be produced and viewed, either with or without color effect, more especially in stereoscopic relief.

A further object is to provide an improved picture projecting apparatus including a lantern portion which may be omitted in use so that the apparatus may be adapted for taking pictures.

A still further object is to provide means whereby, in the attainment of other objects, a film may be operated horizontally and stereoscopic pairs of negatives made thereon, the two images of the pair at a distance apart, one of the pair on a portion of the upper half and the other of the pair on a portion of the lower half of the film.

A still further object is to provide an improved picture film having the images thereon in a novel arrangement and whereby objects above-mentioned are attained in a simple, effective and economical manner.

With the above-mentioned and other objects in view, the invention consists in a combination photographic instrument that is adaptable for taking pictures or for projecting the pictures, and provided with means for operating and guiding a film horizontally in order to attain the most satisfactory stereoscopic effect with a pair of lenses properly spaced apart, and means for operating the film so that there shall be a loop formed thereby between the two of each pair of images on the film. The invention consists further in a pair of complementary color lenses arranged nearly on one and the same horizontal plane, and means for supporting the lenses, so that one of the pair of lenses can project an image on a portion of the upper half of the horizontally operated film, and the other one of the lenses can project an image on a portion of the lower half of the film, one combination of each of the pair of color lenses containing the complementary colors being removable so that a colorless lens combination may be substituted therefor, in order that stereoscopic records lacking complementary color values may be made.

The invention consists further in means whereby the apparatus when in use as a projector is enabled to project a stereoscopic pair of images side by side, or to converge them to a common point so that the images shall be superimposed; means whereby the paired images may be viewed and caused to appear as a single picture in stereoscopic relief, in some cases with natural color effect; means whereby a pair of images, whether taken with a pair of complementary color lenses or with a pair of colorless lenses, will in either case be projected superimposedly through the pair of color lenses and the superposed picture be unitedly viewed by means of a complementary color pair of glasses, lenses or media, in which case the pair of images that had been taken by the pair of color lenses will appear in approximately natural colors and stereoscopic relief, and the pair of images that were taken by the pair of colorless lenses will appear in stereoscopic relief but without color effect.

Further, the invention includes adjustable and interchangeable apparatus for producing either plain stereoscopic effects, or natural color stereoscopic effects, and comprising means whereby the focus and convergence of the lenses of the instrument can be altered by a single movement during the taking of the pictures; also converging and diverging means whereby the instrument is adaptable to be used to either pairedly or superimposedly project the image pairs. And the invention consists also further in the novel methods, and in the novel parts and combinations and arrangements of parts, as hereinafter particularly described and further set forth in the accompanying claims.

Referring to the accompanying drawings which illustrate the improved apparatus in suitable form as to the essentials thereof—

Throughout the drawings, similar reference characters thereon indicate corresponding elements or features of construction herein referred to and described.

In a practical application of the invention in accordance with the improved method, a photographic instrument is provided and is preferably so constructed as to be readily adapted or interconvertible either for taking or projecting pictures, and so constructed as to be removably connected with light-projecting apparatus comprising lamps and condensers. The photographic instrument includes an inclosing casing which preferably comprises a bottom 1, a front wall 2, a rear wall 3, and side walls 4 and 5, the walls being fixed upon the bottom, and a suitable top 6 upon the walls. Reel houses 7 and 8 are connected to the side walls 4 and 5 respectively. The front wall preferably is constructed so as to have a recess in which to mount and protect various elements of the instrument, and for this purpose two wings 9 and 10 are extended rearward from opposite sides of a gap in the front wall, the wings extending from the bottom to the top of the casing, and a post 11 is supported on the bottom and extends to the top between the ends of the wings. The wings 9 and 10 have vertical offset portions 12 and 13, respectively, to receive joint-bars that are provided to operate between the wings. A vertical partition 14 is fixed on the bottom 1 forward of the post 11 and midway between the offset portions of the wings. The casing is adapted, as will be seen, to be carried bodily and to be supported upon a tripod or otherwise for taking pictures, and when required for projecting purposes the casing is mounted upon a table 15, preferably so as to be removable therefrom, the table being designed to also support a lamp house and condenser. A platform 16 is supported in the casing and extends back of the post 11 and also forward between the side walls and the wings of the casing. The post 11 is provided on opposite sides thereof with hinges 17 and 18 for pivotally guiding a pair of carriers. One carrier comprises a base 19 that is arranged so as to be laterally movable between the wing 9 and the partition 14, the other carrier comprising a base 21 that is similarly arranged between the partition and the wing 10. The carriers comprise also uprights 21 and 22 that are fixed on the bases respectively, one of the uprights being connected to the hinge 17 and extending from the post 11 to the wing 9, the other upright being connected to the hinge 18 and extending to the wing 10, the uprights having sliding relation to the wings, suitable provision being made for preventing the passage of light at the joints. Two partitions 23 and 24 are arranged on the platform 16 to form one light-passage, two other partitions 25 and 26 being similarly arranged to form another light-passage, the partitions conveniently extending to the top 6 of the casing. One light-passage is in communication with an aperture 27 formed in the rear wall 3, the other light-passage having communication with an aperture 28 formed also in the wall. The back wall 3 has a suitable frame 29 on its outer side in which are apertures 30 and 31 to receive condenser tubes, and a shutter slide 32 is movably mounted in the frame so as to close the apertures in the absence of the tubes and exclude light from the light-passages. The uprights 21 and 22 have apertures 33 and 34 therein respectively to permit the passage of light, either forward from the light-passages when projecting the pictures or rearward from the front to the film in taking the pictures, the rear of the uprights being provided with suitable guides 35 and 36, respectively, suitably spaced apart to permit the passage of the film between the uprights and the guides, suitable provision being made to exclude the light from the films when taking pictures excepting the light designedly admitted to the film through the apertures in the uprights of the carriers, in the present case one of the apertures being on a slightly higher plane than the other, so that one of each pair of pictures shall be on the upper portion and the other of the pair on the lower portion of a horizontally arranged film. The post 11 may be different in width in different machines, and therefore the uprights and the light apertures therein may be spaced greater or lesser distances apart, so that the two of each pair of pictures or records may be spaced more or less apart on the film. The carriers being pivotally guided so as to move horizontally, they are provided respectively with vertical joint-bars 37 and 38 that are fitted into the offset portions 12 and 13 respectively of the wings of the front wall, and their adjacent inner sides are provided respectively with joint-bars 39 and 40 that are fitted movably into a suitable opening 41 in the partition 14, the joint-bars preventing the passage of light. A lens holder 42 is adjustably mounted upon the base 19 of one carrier and is movably fitted closely between the joint-bars 37 and 39 to prevent the passage of light, the holder being movable forward or rearward for focusing purposes. Another lens holder 43 is likewise mounted upon the base 20 between the joint-bars 38 and 40. The holders extend upward a suitable distance and preferably are slidingly fitted under and against top members 44 and 45 supported between the partition 14 and the opposite wings respectively. Suitable lens frames 46 and 47 are securely mounted in the holders 42 and 43 respectively on different horizontal planes and support suitable object lenses 48 and 49 respectively. In some cases the lenses may be clear or colorless, in other cases one lens may have a color element 50, the other lens having a complementary color element 51, when color effect is desired.

Figure 2:
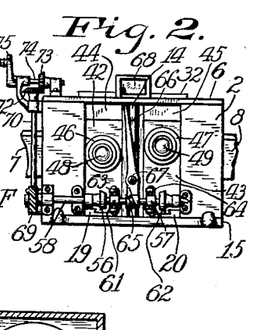
Fig. 2 represents a front elevation of the taking and projecting apparatus showing the preferred arrangement of a pair of complementary color lenses—the front combination preferably bearing the color segment—which may in certain cases be removed and replaced with clear combinations. The lenses of the pair are misalined so that one lens may act on the upper parallel half of the horizontally operated film and the other lens of the pair act on the lower half of the film; also showing mechanism for simultaneously focusing and converging the lenses as indicated by the scale in the finder.
Figure 13:
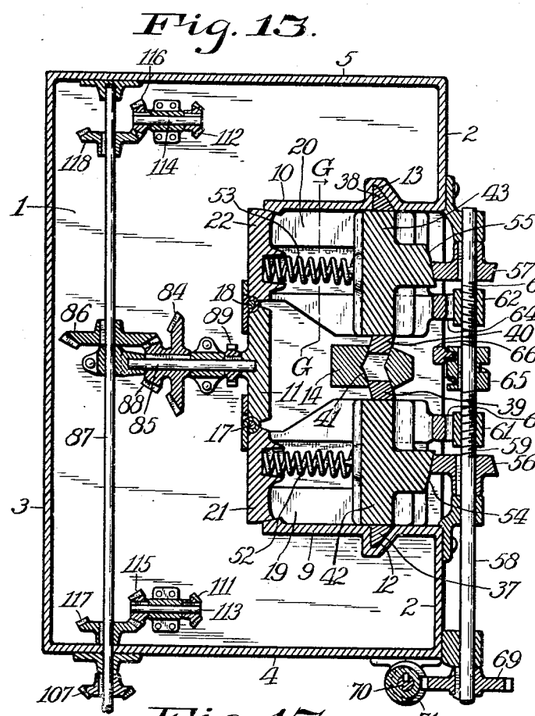
Fig. 13 is a fragmentary section on the line F F on Fig. 1 showing a lens carrier, and converging and focusing means.
Figure 14:
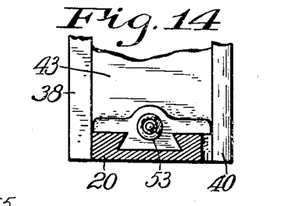
Fig. 14 is a fragmentary section on the line G G on Fig. 13.
Figure 15:
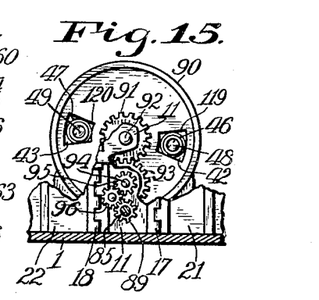
Fig. 15 is an elevation of a shutter with exposure openings slightly misalined with reference to a horizontal plane.

For the purpose of adjusting and controlling the object lenses so as to synchronously change the focus and cause proper convergence of the lenses, two springs 52 and 53 are seated against the uprights 21 and 22 respectively and also against the holders 42 and 43 respectively, the springs being under compression so as to normally force the holders forward. The fronts of the holders have beveled bearing faces 54 and 55 respectively that are in contact with reversely bevel-faced cams 56 and 57 respectively, the cams being secured to an operating and controlling shaft 58 which is rotatably mounted on the front wall of the casing. The shaft has right and left hand screw threads 59 and 60 on which adjusting nuts 61 and 62 are mounted respectively, the nuts being suitably connected to jaws 63 and 64 respectively with which the bases 19 and 20 of the carriers are respectively provided. A worm 65 is secured to the shaft and engages an indicator arm 66 that is mounted on a pivot 67 supported by the partition 14, the arm extending upward and pointing to a suitable scale 68 mounted on the top 6 of the casing for determining the proper adjustment of the lenses at different distances from the objects or scenes of which pictures are required to be taken. The shaft 58 has a suitable gear wheel 69 secured thereto for rotating the shaft, and preferably is rotated and controlled by means of a shaft 70 vertically mounted on one side of the casing, and a worm 71 secured to the shaft in mesh with the wheel 69, the upper end of the shaft 70 being provided with a bevel gear wheel 72 that is engaged by a similar wheel 73 fixed to a shaft 74 and rotatably supported on the casing and provided with a crank 75. The cams 56 and 57 are so designed that when the carriers are moved each toward the other so as to cause convergence of the lenses, the holders are caused to be properly adjusted so that the focus shall be suitable to the degree of convergence obtained.

Whether taking or projecting pictures, a film 76 of the ribbon type is passed between the upright 22 and the guide 36 and also between the upright 21 and the guide 35 so as to be moved longitudinally on a horizontal plane, and therefore the two of each pair of pictures are or may be spaced apart equal to the distance between the apertures 33 and 34, which correspond to the distance between the axes of the object lenses, one picture of the pair being taken or presented on the upper portion and the other one of the pair on the lower portion of the film, all the pictures being normally in uniform arrangement on the film, none being inverted or reversed with respect to others. In some cases it is desirable that the two pictures of each pair be spaced farther apart than the spread of the lenses permits, in which case a loop 77 is formed in the film while the records are being taken, the loop always being between the two pictures of each pair, so that when the film is straightened there shall be considerable space between the two of each pair of records, thus permitting the film to be used in a large and powerful projecting machine capable of projecting the pictures a very considerable distance from the machine. For intermittently moving the film a feed-roll 78 provided with an operating shaft 79 is vertically mounted on the platform 16 so that it shall be between the two branches of the loop rearward of the post 11, the film being suitably guided into contact with opposite peripheral portions of the feed-roll. The feed-roll is provided with suitable intermittent gearing which in the present case comprises a well-known type of pin-wheel 80 secured to the shaft 79 and a driving wheel 81 adapted on each revolution thereof to partially rotate the pin wheel, the wheel 81 being secured to an upright shaft 82 which is suitably supported and extends downward through the platform 16. The lower end of the shaft 82 has a bevel pinion 83 secured thereto that is in mesh with a gear wheel 84 secured to a shaft 85 that is horizontally supported rearward of the post 11. A gear wheel 86 is secured to a driving shaft 87 which is mounted in the casing and extends through the side wall 4 thereof and under the reel house 7, the wheel 86 being in mesh with a pinion 88 that is secured to the shaft 85 adjacent to the wheel 84. A pinion 89 is secured to the shaft 85 behind the post 11. A rotary shutter 90 is mounted between the post 11 and the partition 14 and is provided with a gear wheel 91 for driving it, the shutter and the wheel being on a shaft 92. The wheel 91 is engaged by a gear wheel 93 secured to a shaft 94 that is mounted in the post 11 and has a pinion 95 secured thereto behind the post, the pinion being driven by the pinion or wheel 89 preferably by means of an intermediate gear wheel 96 mounted on the post in engagement with the wheels 89 and 95. The shutter, as will be seen, must operate in synchronism with the feed-roll 78, being geared together. In order to assist in moving the film, preferably two shafts 97 and 98 are vertically mounted in the platform 16 and provided respectively with feed-wheels 99 and 100 to which the film is guided in proximity to the reels 101 and 102 and are mounted in the reel houses 7 and 8, respectively. In order to rotate the reel 101 for winding the film thereon, the reel is provided with a pulley 103. A driving pulley 104 is suitably supported in the reel house and is connected by means of a belt 105 with the pulley 103, the wheel 104 being provided with a bevel gear wheel 106 that is in mesh with a bevel gear wheel 107 which is secured to the shaft 87. The shaft 87 may be driven by various means, preferably being provided with a hand crank 108 for the purpose. The shafts 97 and 98 are provided with bevel pinions 109 and 110 respectively that are in mesh with bevel gear wheels 111 and 112, respectively, which are fixed on shafts 113 and 114 respectively, the shafts being suitably supported on the bottom 1 and provided with bevel pinions 115 and 116 respectively that are in mesh with bevel gear wheels 117 and 118 respectively that are secured to the driving shaft 87. The shutter 90 may be variously constructed, being preferably of disk form having apertures 119 and 120 therein that are intermittently brought to the respective object lenses to permit the passage of light.

Figure 1:
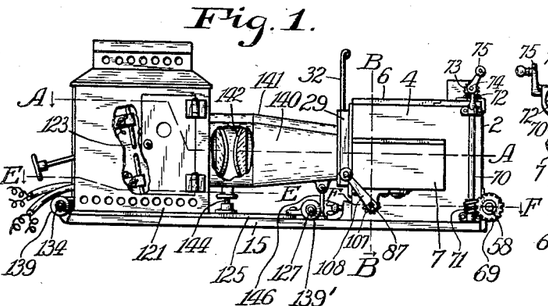
Figure 1 represents a side elevation of the taking and projecting apparatus, partially broken away.
Figures 3, 4, 5:
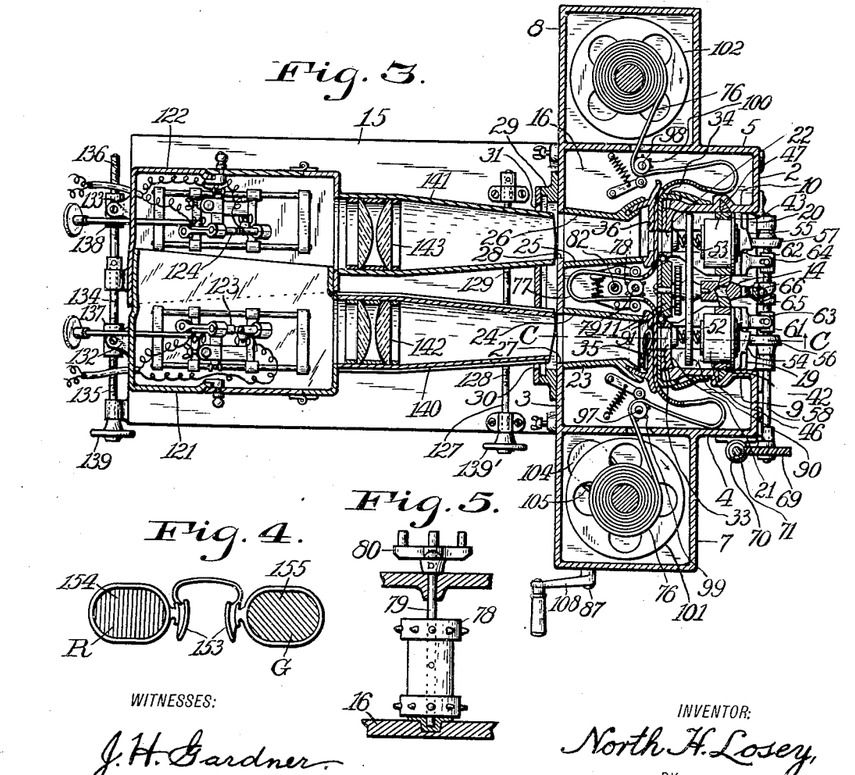
Fig. 3 represents a sectional plan approximately on the line A A on Fig. 1 showing the combined taking and projecting apparatus, the projector being at the rear of the taker; also showing mechanism for horizontally operating the film.
Fig. 4 represents a pair of complementary colored glasses or media for viewing certain forms of projected pictures.
Fig. 5 represents portions of gearing adapted to intermittently operate the film in a horizontal direction.
Figure 6:
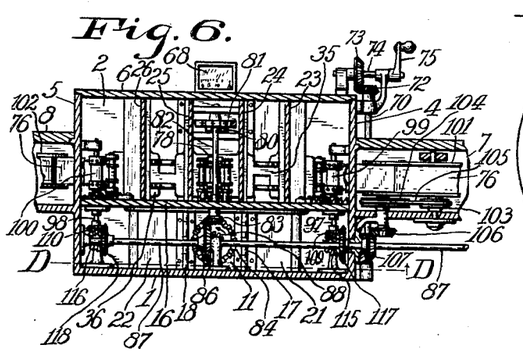
Fig. 6 represents a sectional view of the apparatus on the line B B on Fig. 1, and showing the mechanism for intermittently operating the film past the misalined exposure windows.
Figure 7:
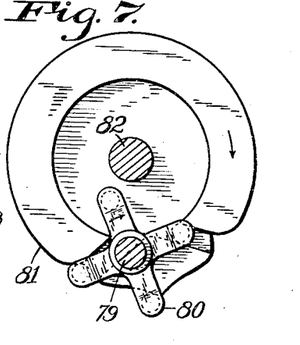
Fig. 7 represents an axial view of parts of the intermittent gearing.
Figures 8, 9, 10, 11, 12:
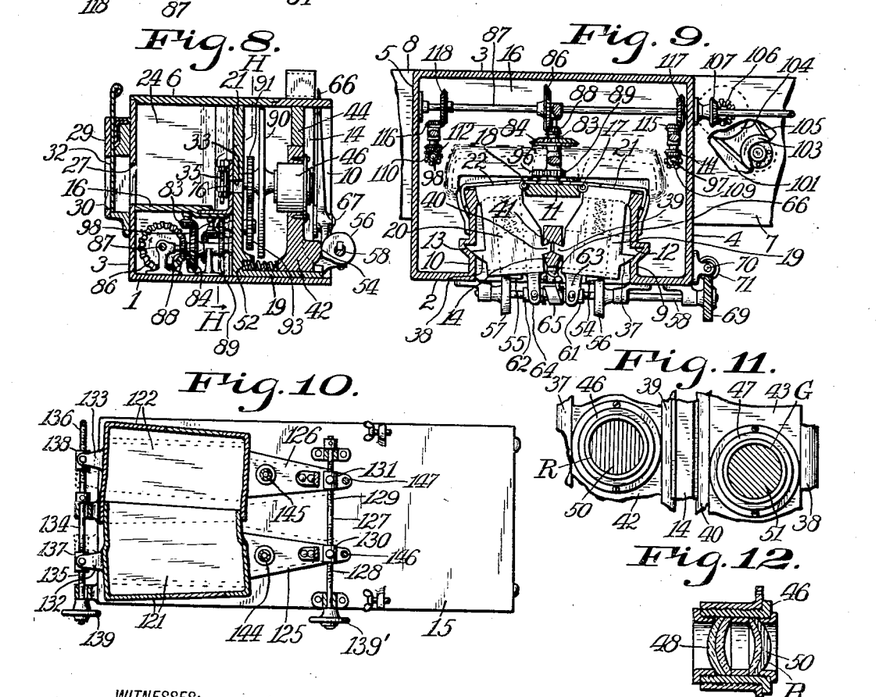
Fig. 8 represents a sectional view of the apparatus on the line C C on Fig. 3, showing the elliptical segment operating against the lens casing, and a slide door at the rear of the casing for excluding light.
Fig. 9 represents a sectional view on the line D D on Fig. 6, looking upward and showing operating gearing.
Fig. 10 is a fragmentary sectional plan on the line E E on Fig. 1 showing converging and diverging means for the lamp casing.
Fig. 11 is a front view of the pair of complementary color lenses in misalinement, the front combination of each lens preferably bearing the color element so as to be readily removed and replaced by clear combinations.
Fig. 12 is a sectional view of a color lens.

An important element of the complete cinematography apparatus comprises a lamp house composed of two casing parts 121 and 122 that are mounted on the table 15 and laterally adjustable, the two parts preferably being telescopically connected together and having suitable lamps 123 and 124 therein respectively. One of the parts has a forward extending arm 125, the other part having a similar arm 126. A shaft 127 is rotatably mounted on the table and has right and left hand screw threads 128 and 129 thereon with which two adjusting nuts 130 and 131 are connected respectively, the nuts being suitably connected to the two arms respectively. On rotation of the shaft 127 the arms of the casing parts are adjusted each with respect to the other. The rear portion of the casing parts are provided with arms 132 and 133 respectively that extend adjacent to a shaft 134 that is rotatably mounted on the table 15 and provided with right and left hand screw threads 135 and 136 to which adjusting nuts 137 and 138 are connected respectively, the nuts being suitably connected with the arms 132 and 133 respectively. The shaft 134 is provided with a hand wheel 139 whereby to rotate the shaft to adjust the rear portions of the casing parts each relatively to the other, the parts being held stationarily by the shaft and the connections when the shaft is at rest. A condenser tube 140 is arranged in connection with the front of the casing part 121 and extends into the aperture 30 so as to direct the light rays through the aperture 27, a similar tube 141 being connected with the casing part 122 and extending into the aperture 31 so as to direct the rays of light from the lamp into the aperture 28, the shutter slide 32 obviously being withdrawn to admit the insertion of the tubes in the apertures. The tubes are provided with suitable condensing lenses 142 and 143 respectively that are arranged in front of the lamps 123 and 124, respectively. The rear portions of the condenser tubes preferably are supported upon adjusting screws 144 and 145 respectively, the forward portions of the tubes being supported upon adjusting screws 146 and 147 respectively, the screws 144 and 146 being mounted on the arm 125, the screws 145 and 147 being mounted on the arm 126. The adjusting screws therefore are carried laterally by the arms and adjust the tubes laterally on rotation of the hand wheel 139' with which the shaft 127 is provided.

Figure 19:
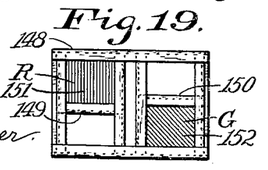
Fig. 19 is a front elevation of a frame and color plates adjustably mounted therein.

In some cases the instrument may be used for taking records on plates, and later for projecting the pictures instead of operating ribbon-like films, and therefore a suitable frame 148 is provided in which holders 149 and 150 are mounted on different horizontal planes, the holders supporting plates or sections of films 151 and 152 respectively, which in some cases may have color or color values R and G respectively, each color being complementary to the other. The frame 148 may be inserted between the upright 21 and the guide 35, and the upright 22 and the guide 36, in the place of the film 76. In such case the shutter 90 may be operated or held at rest by means of its controlling gearing while the frame 148 remains at rest.

In certain cases when the pictures are projected on a screen the pictures may be viewed by means of a nose-glass frame or spectacle frame 153 having colored lenses 154 and 155 therein, one lens having one color R, as red or reddish, the other lens having a complementary color G, as green or greenish, so that the pictures shall appear in approximately natural colors when properly produced for the attainment of such result.

Figure 17:
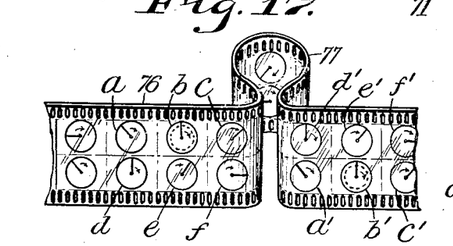
Fig. 17 is a fragmentary perspective view of the improved film looped, and having a plain stereoscopic series of images.

In some cases, according to design, the film 76 may be devoid of color or color value, as illustrated in Fig. 17, but in which case one picture $a$ of each pair is on the upper portion and the other picture $a'$ on the lower portion of the film, the two pictures being separated with intervening pictures or records, one picture $b$ of another pair following the picture $a$, one picture $c$ of another pair following the picture $b$, while on the lower portion of the film the picture $b'$ paired with the picture $b$ follows the picture $a'$, the picture $c'$ paired with the picture $c$ following the picture $b'$. Or, one picture $d$ of a pair and other pictures $e$ and $f$ of other pairs may be produced on the lower portion of the film and the corresponding pictures $d'$, $e'$, and $f'$ of the pairs on the upper portion of the film, the two of each pair being separated.

Figure 16:
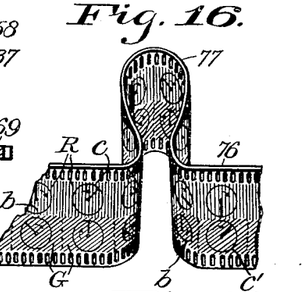
Fig. 16 is a fragmentary perspective view of the improved film produced by the apparatus and bearing stereoscopic image pairs at a distance apart with an intervening loop, the upper row of images being of one color value and the lower row of its complementary color value.

In some cases, as illustrated in Fig. 16, all the records or pictures on the upper portion of the film may have color value R, all those on the lower portion of the film having a complementary color value G, so that the color values alternate vertically or transversely of the film.

Figure 18:
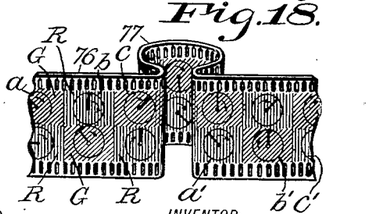
Fig. 18 is a fragmentary perspective view of the improved film looped, and having stereoscopic image pairs at a distance apart, the color value of each image alternating in both vertical and horizontal order throughout the film.

As illustrated in Fig. 18, the records may be produced so that the color values R and G alternate on the upper portion of the film in horizontal direction and also horizontally on the lower portion of the film, being in staggered arrangement, however, so that the color values alternate also in vertical direction and therefore alternate both horizontally or longitudinally of the film, and also vertically or transversely of the film.

In producing the cinematography apparatus, various modifications are contemplated, as it should be understood that the various details described are not arbitrary but illustrate one form of construction as representative of various forms which may be adopted, without departing from the spirit and intent of the invention, within the scope of the appended claims.

In practical use, when the photographic instrument or camera is required to take pictures the shutter slide 32 is closed after removing the instrument from the condenser tubes, the instrument being properly set up for use as is customary. According to the distance the camera may be away from the object to be taken, the object lenses are adjusted as above described by means of the crank 75. The film having been previously threaded properly in the machine and all being ready, the crank 108 is operated with the result that the film is fed intermittently by the feed-rolls described, or by any well-known means, and the shutter 90 synchronously operated. In case the camera is suitably supported so as to be moved, either laterally or radially for following the object or to advance toward or recede from an object, the indicator 68 may be observed while the crank 75 is turned so as to readjust the object lenses as may be required or desired for the best results. The resulting pictures will be colorless or have color value, depending upon the prearranged plan, as will be apparent. When it is desired to project the pictures, a properly prepared film is placed in position as above explained, and the instrument having been connected with the condenser tubes as described, the lamps are put in operation and the crank 108 operated as before, the result being obvious from the foregoing description of the apparatus, the object lenses and also the parts of the lamp house and also the condenser tubes being readily adjusted so as to obtain the best effect on the screen. It will thus be seen, therefore, that all the objects of the invention and others not specifically mentioned are attained in a high degree, the picture or pictures on the screen being viewed without entailing color fatigue of the eye of the observer.

Having thus described the invention, what is claimed as new is—

1. Cinematography apparatus including a photographic instrument provided with convergently adjustable lenses and a light-condensing instrument detachably connected together, the instrument comprising a lamp housing having two laterally adjustable parts provided with condensers, the photographic instrument being interconvertible for either taking or projecting pictures.

2. Cinematography apparatus including two pivotally guided carriers, means for controlling the carriers, two holders adjustably mounted on the carriers respectively and having each a lens thereon, and means for synchronously adjusting the holders to vary the focus of the lenses in synchronism with the adjustment of the carriers.

3. Cinematography apparatus including two carriers pivotally guided for lateral adjustment each with respect to the other, two lens holders mounted on the carriers respectively and adjustable longitudinally of the carriers, each holder having a lens thereon, and means for synchronously adjusting the carriers and the holders.

4. In cinematography apparatus, the combination of a casing having two light-passages therein, two lens holders arranged forward of the light-passages and provided with pivotal guides respectively to permit each holder to be moved toward the other, means for simultaneously moving or holding the holders, two object lenses mounted in the holders respectively, means for guiding a film between the light-passages and the lenses on a horizontal plane, and two light-condensers connected with the light-passages respectively.

5. In cinematography apparatus, the combination of a photographic instrument having two light-passages and also two lenses forward of the light-passages respectively, means for converging the lenses, a lamp house comprising two parts supported for lateral adjustment, each part having a condenser thereon, the condensers being connected with the light-passages respectively, means for adjusting the forward ends of the two parts to converge the condensers, means for adjusting the rearward ends of the two parts to converge the condensers, and means for supporting a film between the lenses and the light-passages.

6. In cinematography apparatus, the combination of a casing having oppositely arranged wings, a post supported between the wings, two carriers arranged between the wings and comprising each a base and an upright, the uprights of the carriers being hinged to the opposite sides respectively of the post to pivotally guide the carriers and extending to the opposite wings respectively, each upright having an aperture therein, two holders mounted on the bases of the carriers respectively, and two lenses mounted in the holders respectively opposite the apertures respectively.

7. In cinematography apparatus, the combination of a casing having oppositely arranged wings, two carriers supported between the wings and comprising each a base and an upright, each upright having an aperture therein, two holders movably mounted on the bases of the carriers for adjustment relative to the uprights respectively, two lenses mounted in the holders respectively opposite the apertures respectively, a shaft rotatably mounted on the casing, two cams fixed on the shaft and having contact with the holders respectively for retracting the lenses, and two springs under compression between the uprights respectively and the opposite holders for advancing the holders.

8. In cinematography apparatus, the combination of a casing having oppositely arranged wings, an upright post between the wings, two uprights supported on opposite sides respectively of the post and extending to the wings respectively, each upright having an exposure aperture therein, the post and the uprights constituting a partition in the casing, two object lenses supported forward of the apertures, means for guiding a film horizontally on the rear side of the uprights for exposure at the apertures, a shaft rotatably mounted vertically rearward of the post, and a feed roll fixed on the shaft for moving the film.

9. In cinematography apparatus, the combination of a casing, two carriers pivotally guided in the casing for horizontal movement each toward or from the other and having each an arm thereon, two nuts connected to the arms respectively, two holders adjustably mounted on the carriers respectively and having each a lens thereon, means for adjusting the holders on the carriers in unison, and a shaft rotatably mounted on the casing and having oppositely pitched screw threads engaging the nuts respectively to adjust the carriers.

10. In cinematography apparatus, the combination of a photographic instrument comprising a casing having apertures in its rear portion, a lamp house opposite the apertures, and condenser tubes connected with the lamp house and the apertures of the casing, each end portion of each one of the tubes being provided with an adjusting screw for raising or lowering the said end portion, with object lenses supported by the casing forward of the apertures respectively.

11. In cinematography apparatus, the combination of a casing, two carriers pivotally guided in the casing for lateral movement each relative to the other and having each an arm thereon, two adjusting nuts connected to the arms respectively, two holders movably mounted on the carriers respectively and having each a bevel face portion, two object lenses mounted on the holders respectively, a shaft rotatably mounted on the casing and having oppositely pitched screw threads thereon that engage the nuts respectively to converge the carriers for converging the lenses, two cams fixed to the shaft and having contact with the bevel faces of the holders respectively for adjusting the focus of the lenses to correspond to their convergence, two springs arranged to hold the holders to the cams, an indicator arm pivoted to the casing, and a worm secured to the shaft and engaging and controlling the arm.

12. In cinematography apparatus, the combination of a casing comprising a front wall, a post fixed in the casing, a partition fixed in the casing forward of the post, two carriers hinged to opposite sides of the post respectively, each carrier having two upright joint bars fixed thereon, one of the bars having sliding contact with a portion of the partition, the other of the bars having sliding contact with a portion of the front wall, two holders mounted on the carriers respectively between the joint bars thereof, each holder being adjustably movable relative to the front wall, and two object lenses mounted on the holders respectively.

13. In cinematography apparatus, the combination with a photographic instrument casing having two apertures in the rear wall thereof, two object lenses in the casing forward of the apertures respectively, and a table supporting the casing, of a lamp house comprising two parts movably supported upon the table, each part having a short arm on its rearward end and a relatively long arm on its forward end, two adjusting nuts connected to the short arms respectively, means for guiding the long arms, two condensers comprising tubes supported on the long arms and connected with the apertures respectively and also with the lamp house parts respectively, and a shaft rotatably mounted on the table and having oppositely pitched screw threads in engagement with the nuts respectively.

14. In cinematography apparatus, the combination with a photographic instrument casing having two apertures in its rear wall, two object lenses in the casing forward of the apertures respectively, and a table supporting the casing, of a lamp house comprising two parts movably supported upon the table, each part having an arm on its forward end extending toward the casing, means for guiding the rearward ends respectively of the said parts, two adjusting nuts connected to the arms respectively, a shaft rotatably mounted on the table and having oppositely pitched screw threads engaging the nuts respectively, and two condensers comprising tubes supported on the arms respectively and connected with the house parts respectively and also with the apertures respectively.

In testimony whereof, I affix my signature in presence of two witnesses.

NORTH H. LOSEY.

Witnesses:
E. T. SILVIUS,
TIMOTHY P. SEXTON.